United States Patent
Fuechtner et al.

(10) Patent No.: US 8,047,959 B2
(45) Date of Patent: Nov. 1, 2011

(54) METHOD FOR STARTING A PISTON ENGINE AND HYBRID DRIVE FOR PERFORMING THE METHOD

(75) Inventors: Martin Fuechtner, Stuttgart (DE); Dieter Kraxner, Wurmberg (DE); Markus Goehring, Nufringen (DE); Marco Fleckner, Leonberg (DE); Nils Sauvlet, Gerlingen (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 968 days.

(21) Appl. No.: 11/970,953

(22) Filed: Jan. 8, 2008

(65) Prior Publication Data

US 2009/0124452 A1    May 14, 2009

(30) Foreign Application Priority Data

Jan. 9, 2007    (DE) .......................... 10 2007 001 424

(51) Int. Cl.
*B60W 10/08* (2006.01)
(52) U.S. Cl. ............................................................ 477/5
(58) Field of Classification Search .................. 477/3, 5, 477/6, 7–27, 99, 101, 167, 174, 181
See application file for complete search history.

(56) References Cited

U.S. PATENT DOCUMENTS

| | | | |
|---|---|---|---|
| 6,253,127 B1 | 6/2001 | Itoyama et al. | |
| 7,243,010 B2 * | 7/2007 | Tabata et al. | 701/22 |
| 2006/0137921 A1 | 6/2006 | Colvin et al. | |

FOREIGN PATENT DOCUMENTS

| | | |
|---|---|---|
| AT | 413 806 B | 6/2006 |
| DE | 198 08 472 A1 | 9/1999 |
| DE | 199 49 773 A1 | 6/2000 |
| DE | 102 60 435 A1 | 7/2004 |
| DE | 10 2004 002 061 A1 | 8/2005 |
| DE | 20 2005 019 996 U1 | 4/2006 |

* cited by examiner

*Primary Examiner* — J. Allen Shriver, II
*Assistant Examiner* — Erez Gurari
(74) *Attorney, Agent, or Firm* — Gerald E. Hespos; Michael J. Porco

(57) ABSTRACT

A method is provided for starting a piston engine of a hybrid drive in an electric travel state. The hybrid drive includes at least the piston engine, an electric motor, a transmission, and a clutch situated between the piston engine and the electric motor. A converter lockup clutch, which is switchable into a slip state, is also provided. A slip is set at the converter lockup clutch, and a speed of the electric motor is then increased. The speed and the torque either do not change or only change in a predefined range at the output side of the converter lockup clutch. The clutch is closed to transmit a torque pulse, so that a first top dead center of the piston of the piston engine may be overcome. A predefined slip is then set at the clutch.

20 Claims, 1 Drawing Sheet

METHOD FOR STARTING A PISTON ENGINE AND HYBRID DRIVE FOR PERFORMING THE METHOD

This application claims the priority of German application 10 2007 001 424.6, filed Jan. 9, 2007, the disclosure of which is expressly incorporated by reference herein.

BACKGROUND AND SUMMARY OF THE INVENTION

The present invention relates to a method for starting a piston engine of a hybrid drive in an electric travel state. The present invention additionally relates to a hybrid drive for a motor vehicle for performing the method and a motor vehicle equipped with a hybrid drive of this type.

Hybrid drives are a modern form of drive technology in motor vehicles and allow reduced-emission travel. In a hybrid vehicle having the capability for solely electrical travel, i.e., in a so-called full hybrid vehicle, the piston engine must be able to be started during the electrical travel, if a power demand exceeding the electric motor must be covered. In a parallel hybrid drive having a clutch between the piston engine and the electric motor, the piston engine is started by being push-started by closing the clutch. A constant clutch torque is set to start the piston engine, which must be reliably sufficient to overcome the first top dead center of the piston of the piston engine. The electric motor must maintain the applied clutch torque to be able to avoid collapse of the output speed and thus jerking in the driving behavior. In particular to avoid jerking of this type and to absorb torque spikes during the starting procedure, a slight slip is permitted at a converter lockup clutch which is situated between the electric motor and the output train. However, it is problematic that the starting torque required to push-start the piston engine must be provided by the electric motor and is therefore not available for driving the motor vehicle. An ideal starting procedure of the piston engine is to occur, however, without changing the currently existing travel state in regard to noise, vibration, and acceleration levels.

The present invention is concerned with the problem of specifying a method for starting a piston engine of a hybrid drive in an electric travel state, which particularly allows soft starting of the piston engine.

This problem is solved according to the present invention by way of a particular method for starting a piston engine of a hybrid drive in an electric travel state. The hybrid drive includes at least the piston engine, an electric motor, a transmission, a clutch, which is situated between the piston engine and the electric motor, and a converter lockup clutch. The converter lockup clutch is situated between the electric motor and the transmission and switchable into a slip state, in which it transmits a reduced torque or no torque from the electric motor to the transmission. The method includes the acts or operations of setting a slip at the converter lockup clutch, increasing a speed of the electric motor from an initial speed to a starter speed and setting the speed in such a way that the speed and the torque do not change or only change in a predefined range at an output side of the converter lockup clutch. A torque is rapidly applied, on and off, at the clutch situated between the piston engine and the electric motor in such a way that a torque pulse sufficient to overcome a first top dead center of a piston of the piston engine is transmitted to the piston engine. A start of the piston engine is initiated at or close to overcoming the first top dead center, and a predefined slip, and thus a predefined torque, are set at the clutch in such a way that the electric motor, upon reaching its starting speed, both supports a run-up of the piston engine and transmits a positive torque to the converter lockup clutch. The slip of the converter lockup clutch is reduced enough that the speed and the torque do not change or only change in a predefined range at the output side of the converter lockup clutch. Advantageous embodiments are also claimed.

The present invention is based on the general idea of only applying a brief torque pulse on and off to the clutch to overcome a first top compression dead center of a piston of the piston engine. This pulse is supplied by the component inertia, i.e., the mass inertia, of the output-side components of a friction face of the (interrupting) clutch on the output side and the friction face of the converter lockup clutch on the drive side including a rotor of an electric motor, the electric motor being accelerated to a higher speed at uniform output torque before the starting event. The speed difference between electric motor on one hand and transmission on the other hand is achieved by setting a slip at a converter lockup clutch situated between the electric motor and the transmission, so that the required output torque is available at the output side of the converter, while on the drive side of the converter, the electric motor generates a small additional torque to accelerate the above-mentioned inertial masses. It is thus possible for only a part of the torque required for starting the piston engine to have to be reserved by the electric motor, and in particular the torque pulse being used to start the piston engine. Therefore, the method according to the present invention has the special advantage that the torque required to overcome the first top dead center is primarily applied by a mass inertia of the rotating rotor of the electric motor, and the torque to be applied later by the electric motor after the first ignition of the piston engine is significantly less and thus requires less torque reserve.

In an advantageous refinement of the present invention, the starting procedure is triggered in that a torque demand of the hybrid drive exceeds a threshold value, at which a torque applicable by the electric motor no longer corresponds to the torque demand. It may be necessary to engage the internal combustion engine if a power of the electric motor no longer corresponds to a required power level, which may occur in the event of a weak battery or too high required speeds of the electric motor. If an operating state of this type occurs, it is necessary to start the piston engine to support the electric motor, which then also feeds torque into the drivetrain after the run-up, and thus may support and/or relieve the electric motor. However, uncontrolled starting of the electric motor is to be precluded, because it is undesirable from both ecological and also economic aspects. The introduction of the above-mentioned threshold is therefore a simple and effective possibility for precisely fixing the starting time of the piston engine. The threshold value may be fixed at different levels depending on the design of the piston engine and/or electric motor.

Further important features and advantages of the present invention are apparent from dependent claims, the drawing, and the associated description of the drawing.

The features noted above and explained in the following are usable not only in the particularly specified combination, but also in other combinations or alone, without leaving the scope of the present invention.

A preferred exemplary embodiment of the present invention is illustrated in the drawing and described in greater detail in the following description.

DETAILED DESCRIPTION OF THE INVENTION

Figure 1:
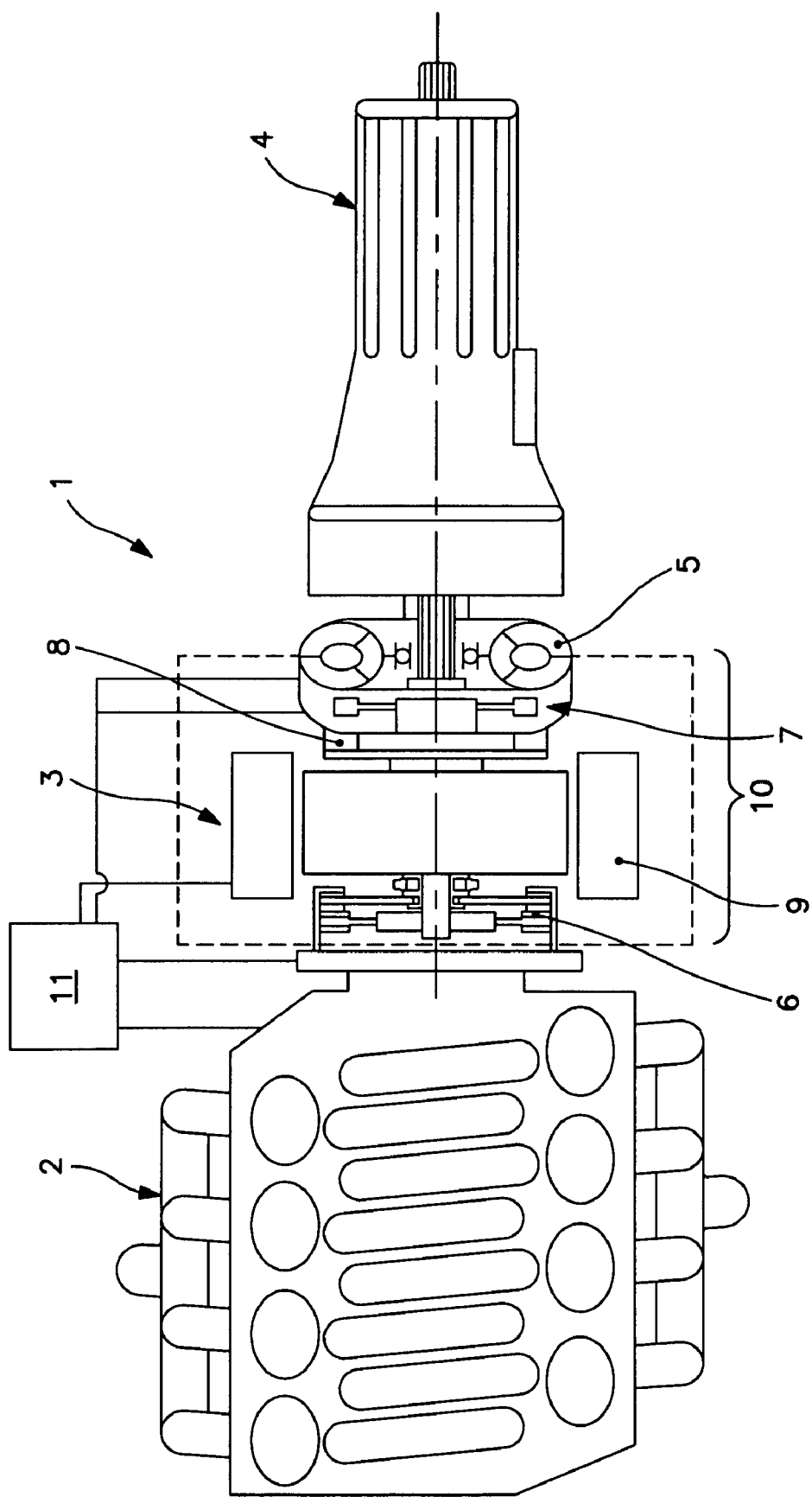
FIG. 1 shows a schematic illustration of a hybrid drive according to the present invention.

According to FIG. 1, a hybrid drive 1 according to the present invention for a motor vehicle (not shown further) has a piston engine 2, which may also be called an internal combustion engine 2 in the following, an electric motor 3, as well as a transmission 4 and a converter 5. A clutch 6, in particular an interrupting clutch, is situated between the piston engine 2 and the electric motor 3, which, in the closed state, connects the internal combustion engine 2 to the electric motor 3 in a driving manner and, in the open state, decouples a part of the drivetrain placed on the output side of the internal combustion engine 2 from the internal combustion engine 2. The above-mentioned converter 5 is situated between the electric motor 3 and the transmission 4, the converter 5 having a converter lockup clutch 7 on the drive side. An axial expansion element 8 may also be situated between the converter lockup clutch 7 and a rotor 9 of the electric motor 3, for example, in the form of a sheet-metal disk, which may absorb axial expansions of the converter 5 and thus reduce a tension load of the drivetrain. An output-side part of the clutch 6, the electric motor 3, and the converter lockup clutch 7 may thus also be referred to together as a hybrid module 10.

The hybrid drive 1 shown in FIG. 1 is implemented as a so-called parallel hybrid drive 1, so that the piston engine 2 and the electric motor 3 may introduce torque into the transmission 4 both alternatively and cumulatively. A cumulative introduction of torque is desirable in a boost operating state, in which a separate power of the internal combustion engine 2 and/or the electric motor 3 does not meet a required power demand. Furthermore, the hybrid drive 1 from FIG. 1 is preferably a so-called full hybrid drive, in which in addition to travel operation solely with the internal combustion engine, solely electrical travel operation is also possible. In solely electrical travel, the internal combustion engine 2 is turned off and is only engaged at an increased power, and/or upon reaching a lower limiting value of the performance capability of the battery, from which solely electrical travel is no longer possible. To be able to execute this engagement of the internal combustion engine 2 as softly as possible, i.e., as free of jerking, noise, and vibration as possible, a control unit 11 is provided, which is connected at least to the internal combustion engine 2, the clutch 6, and the electric motor 3 and/or the converter 5, and in particular the converter lockup clutch 7.

Both the clutch 6 and also the converter lockup clutch 7 may be switched into a slip state, in which they transmit a reduced torque or no torque at all.

In the following, a method for starting the piston engine 2 of the hybrid drive 1 in an electric travel state, which may be controlled and/or initiated by the control unit 11, is explained.

The starting procedure of the internal combustion engine 2 is triggered when a torque demand of the driver exceeds a defined threshold, at which a torque applicable solely by the electric motor 3 no longer corresponds to the required torque demand. If this state occurs, a slip is set at the converter lockup clutch 7, and the speed of the electric motor 3 is increased from an initial speed to a starter speed, in such a way that the speed and the transmitted torque do not change or only change in a predefined range at the output side of the converter lockup clutch 7. This has the effect that a constant speed and/or a constant drive torque may be provided at the output side of the converter 5 to the transmission 4 even during the starting procedure of the internal combustion engine 2.

If the electric motor 3 has reached its starter speed, a torque is rapidly applied on and off at the clutch 6 situated between the internal combustion engine 2 and the electric motor 3, and a torque pulse sufficient to overcome a first top ignition dead center of a piston of the piston engine 2 is transmitted to the piston engine 2. This torque pulse is generated by the mass inertia of the rotating rotor 9 of the electric motor 3. A main goal of the present invention, namely reducing a required torque reserve of the electric motor 3 for starting the internal combustion engine 2 and providing a greater electrical travel range, is thus achieved. The piston engine 2 is thus started at or close to overcoming the first top ignition dead center. After overcoming the above-mentioned dead center, a predefined slip and thus a low predefined torque are set at the clutch 6, in such a way that the electric motor 3, upon reaching its output speed, supports the run-up of the piston engine 2 on one hand and transmits a positive torque to the converter lockup clutch 7 on the other hand. The slip of the converter lockup clutch 7 is reduced enough that the speed and the torque do not change or only change in a predefined range at its output.

Because of the ignition procedures started in the internal combustion engine 2 after overcoming the first top dead center, it only requires a further push-start torque, which is small in comparison to the starting torque, for the further run-up, which may be provided without problems by the electric motor 3. If the piston engine 2 and the electric motor 3 have reached a synchronous speed, the clutch 6 may be completely closed. It is conceivable that before the clutch 6 is completely closed, a speed of the electric motor 3 is reduced and thus an overshoot is prevented. After the clutch 6 is completely closed, the slip in the converter lockup clutch 7 may also be cancelled and thus the torque cumulatively generated by the internal combustion engine 2 and the electric motor 3 may be fed into the drivetrain.

Before the starting procedure is triggered, i.e., before the slip is set at the converter lockup clutch 7, a gear changing block (not shown in greater detail) is activated, which is to prevent a shifting procedure in particular in a transmission 4 implemented as an automatic transmission, which would interfere with a starting procedure of the internal combustion engine 2. If the internal combustion engine 2 has started and run up, and both the clutch 6 and also the converter lockup clutch 7 are closed, the gear changing block may also be deactivated again.

In the method according to the present invention, the piston of the piston engine 2 is advantageously rotated toward the first top dead center before the actual transmission of the torque pulse. A rotation of this type may be caused, for example, by the control unit 11 shortly before beginning the starting procedure by presetting a small clutch torque.

Because the sequences during the starting phase of the piston engine 2 are very time critical, dead times are absolutely to be avoided during the transmission of signals. Dead times of this type may be caused, for example, by CAN runtimes, computing times, and sampling frequencies of sensors, etc. Therefore, the controller of all participating components and a direct interface for all sensor signals are ideally combined in the control unit 11 according to the present invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A method for starting a piston engine of a hybrid drive in an electric travel state, the hybrid drive comprising at least the piston engine, an electric motor, a transmission, a clutch, which is situated between the piston engine and the electric motor, and a converter lockup clutch, the converter lockup clutch being situated between the electric motor and the transmission and being switchable into a slip state, in which it transmits a reduced torque or no torque from the electric motor to the transmission, comprising:
   setting a slip at the converter lockup clutch,
   increasing a speed of the electric motor from an initial speed to a starter speed and setting the speed in such a way that the speed and the torque do not change or only change in a predefined range at an output side of the converter lockup clutch,
   rapidly applying a torque on and off at the clutch situated between the piston engine and the electric motor in such a way that a torque pulse sufficient to overcome a first top dead center of a piston of the piston engine is transmitted to the piston engine,
   initiating a start of the piston engine at or close to overcoming the first top dead center, and
   setting a predefined slip and thus a predefined torque at the clutch in such a way that the electric motor, upon reaching its starting speed, both supports a run-up of the piston engine and transmits a positive torque to the converter lockup clutch, slip of the converter lockup clutch being reduced enough that the speed and the torque do not change or only change in a predefined range at the output side of the converter lockup clutch.

2. The method according to claim 1, wherein starting is triggered when a torque demand of the hybrid drive exceeds a threshold value, at which a torque applicable solely by the electric motor no longer corresponds to the torque demand.

3. The method according to claim 1, wherein a gear shifting block is activated before setting the slip at the converter lockup clutch.

4. The method according to claim 1, wherein the clutch is completely closed upon reaching a synchronous speed of the piston engine and electric motor.

5. The method according to claim 1, wherein, before the clutch is completely closed, a speed of the electric motor is reduced and an overshoot of the speed of the piston engine is prevented.

6. The method according to claim 1, wherein slip is cancelled in the converter lockup clutch after the clutch is completely closed, wherein a gear changing block is deactivated after the clutch is completely closed, or wherein slip is cancelled in the converter lockup clutch and the gear changing block is deactivated after the clutch is completely closed.

7. The method according to claim 1, wherein the electric motor may also generate a torque to reach a boost operating state after the clutch is completely closed.

8. A hybrid drive for a motor vehicle, for performing the method according to claim 1, comprising:
   a control unit, which is at least connected to the piston engine, the electric motor, the clutch, and the converter lockup clutch,
   wherein the control unit sets a slip at the converter lockup clutch, increases the speed of the electric motor from an initial speed to a starter speed and sets it in such a way that the speed and the torque do not change or only change in a predefined range at the output of the converter lockup clutch, rapidly applies a torque on and off at the clutch situated between the piston engine and the electric motor in such a way that a torque pulse sufficient to overcome a first top dead center of the piston of the piston engine is transmitted to the piston engine, initiates the starting procedure of the piston engine at or close to overcoming the first top dead center, and sets a predefined slip and thus a predefined torque at the clutch in such a way that the electric motor, upon reaching its initial speed, supports run-up of the piston engine and transmits a positive torque to the converter lockup clutch, the slip of the converter lockup clutch being reduced enough that the speed and the torque do not change or only change in a predefined range at the output of the converter lockup clutch.

9. The hybrid drive according to claim 8, wherein the control unit rotates the piston of the piston engine toward the first top dead center before transmission of the torque pulse.

10. The hybrid drive according to claim 8, wherein a drive-side speed of the converter lockup clutch during the starting procedure of the piston engine is always greater than an output-side speed of the converter lockup clutch.

11. A motor vehicle having a hybrid drive according to claim 8.

12. The method according to claim 2, wherein a gear shifting block is activated before setting the slip at the converter lockup clutch.

13. The method according to claim 2, wherein the clutch is completely closed upon reaching a synchronous speed of the piston engine and electric motor.

14. The method according to claim 3, wherein the clutch is completely closed upon reaching a synchronous speed of the piston engine and electric motor.

15. The method according to claim 2, wherein, before the clutch is completely closed, a speed of the electric motor is reduced and an overshoot of the speed of the piston engine is prevented.

16. The method according to claim 3, wherein, before the clutch is completely closed, a speed of the electric motor is reduced and an overshoot of the speed of the piston engine is prevented.

17. The method according to claim 4, wherein, before the clutch is completely closed, a speed of the electric motor is reduced and an overshoot of the speed of the piston engine is prevented.

18. The method according to claim 2, wherein slip is cancelled in the converter lockup clutch after the clutch is completely closed, wherein a gear changing block is deactivated after the clutch is completely closed, or wherein slip is cancelled in the converter lockup clutch and the gear changing block is deactivated after the clutch is completely closed.

19. method according to claim 3 wherein slip is cancelled in the converter lockup clutch after the clutch is completely closed, wherein a gear changing block is deactivated after the clutch is completely closed, or wherein slip is cancelled in the converter lockup clutch and the gear changing block is deactivated after the clutch is completely closed.

20. The method according to claim 4, wherein slip is cancelled in the converter lockup clutch after the clutch is completely closed, wherein a gear changing block is deactivated after the clutch is completely closed, or wherein slip is cancelled in the converter lockup clutch and the gear changing block is deactivated after the clutch is completely closed.

* * * * *